United States Patent
Pauli

(10) Patent No.: US 9,621,379 B2
(45) Date of Patent: Apr. 11, 2017

(54) ARRANGEMENT FOR CONNECTING A COMPONENT TO A MASTER CONTROLLER IN A MOTOR VEHICLE

(71) Applicant: Robert Bosch GmbH, Stuttgart (DE)

(72) Inventor: Stephan Pauli, Achern (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/908,143

(22) PCT Filed: Jun. 27, 2014

(86) PCT No.: PCT/EP2014/063661
§ 371 (c)(1),
(2) Date: Jan. 28, 2016

(87) PCT Pub. No.: WO2015/014552
PCT Pub. Date: Feb. 5, 2015

(65) Prior Publication Data
US 2016/0182258 A1 Jun. 23, 2016

(30) Foreign Application Priority Data
Jul. 31, 2013 (DE) ........................ 10 2013 214 953

(51) Int. Cl.
*H04L 25/00* (2006.01)
*H04L 25/02* (2006.01)
(Continued)

(52) U.S. Cl.
CPC ........ *H04L 25/0264* (2013.01); *H04L 1/0001* (2013.01); *H04L 25/0266* (2013.01); *H04L 25/4902* (2013.01)

(58) Field of Classification Search
CPC ............ H04L 25/0272; H04L 25/0292; H03B 2203/05408; H04B 2203/5416
(Continued)

(56) References Cited

U.S. PATENT DOCUMENTS 6,502,997 B1 * 1/2003 Lee ...................... H04B 10/801
385/88
8,965,630 B2 * 2/2015 Wyatt .................. B60K 7/0007
318/375
(Continued)

FOREIGN PATENT DOCUMENTS

DE 197 55 050 A1 7/1999
DE 10 2011 053 904 A1 3/2013
(Continued)

OTHER PUBLICATIONS

International Search Report corresponding to PCT Application No. PCT/EP2014/063661, mailed Sep. 26, 2014 (German and English language document) (5 pages).

*Primary Examiner* — Khai Tran
(74) *Attorney, Agent, or Firm* — Maginot, Moore & Beck LLP

(57) ABSTRACT

An arrangement for a motor vehicle includes a master controller and a slave controller that use different reference-earth voltages and respectively comprise a transmission and a reception unit for shared data interchange. The transmission and reception units are connected to one another via a shared communication line. The communication line contains a diode that prevents a flow of current from the slave controller to the master controller. The master controller contains a pull-up resistor via which the shared communication line can be connected to a first reference-earth potential of the reference-earth voltage of the master controller.

12 Claims, 5 Drawing Sheets

(51) Int. Cl.
*H04L 1/00* (2006.01)
*H04L 25/49* (2006.01)

(58) Field of Classification Search
USPC .................................. 375/257, 256; 307/10.1
See application file for complete search history.

(56) References Cited

U.S. PATENT DOCUMENTS

2011/0133715 A1* 6/2011 Zushi ................... G01R 31/024
 323/285
2013/0328394 A1* 12/2013 Guittonneau ......... H02M 1/083
 307/10.1

FOREIGN PATENT DOCUMENTS

EP 1 291 998 A2 3/2003
FR 2 850 071 A1 7/2004

* cited by examiner

ARRANGEMENT FOR CONNECTING A COMPONENT TO A MASTER CONTROLLER IN A MOTOR VEHICLE

This application is a 35 U.S.C. §371 National Stage Application of PCT/EP2014/063661, filed on Jun. 27, 2014, which claims the benefit of priority to Serial No. DE 10 2013 214 953.0, filed on Jul. 31, 2013 in Germany, the disclosures of which are incorporated herein by reference in their entirety.

BACKGROUND

The present disclosure relates to an arrangement including a master controller and a slave controller which are interconnected for exchanging data with each other via a communication line. The present disclosure also relates to the master controller and the slave controller.

Components in the motor vehicle which are controllable via a central controller, hereinafter master controller, and which operate at a reference voltage differing from the reference voltage of the master controller, each require separate power supply lines and ground connections in order to ensure that fault currents into the master controller are prevented in the event of a loss of ground, in the event of short circuits, or due to reversed polarities.

For the communication with the master controller, such components each have a transceiver unit, wherein the transceiver unit communicates with the transceiver unit of the master controller. In addition, such components include a consumer, for example, a positioning drive for a seat, a windshield wiper, a tailgate, or a window. Furthermore, such components include a device controller which is provided for the control of the consumer as a function of the data transmitted by the master controller.

In most cases, multiple such components are connectable to the master controller. In this case, the communication between the components and the master controller, i.e., which device accesses the communication line at which time, is controlled via a protocol in which the master controller in most cases acts as the master and the components in most cases act as slaves. Therefore, an electrical portion of each of the components, which includes its transceiver unit and its device controller, is hereinafter referred to as a slave controller.

A master controller conventionally functions at a 12V on-board electrical system voltage as the reference voltage. It provides the slave controllers, which often operate at a reference voltage of 12V, 24V, or 48V, with a pulse width modulated (PWM) communication signal for the communication via the communication line, which includes control commands for controlling the consumers.

In order to prevent fault currents which may damage the master controller, the connection of slave controllers which use a reference voltage other than that of the master controller has previously been allowable only via galvanic isolation.

FIG. 1 shows an arrangement having a first specific embodiment of a slave controller and a master controller, in which both the master controller and the slave controller use a 12V on-board electrical system voltage as the reference voltage. Therefore, in this specific embodiment according to the related art, no galvanic isolation is required.

FIG. 2 shows an arrangement according to the related art having a second specific embodiment of a slave controller which uses a reference voltage different from that of the master controller, for example, a 24V or 48V reference voltage instead of the 12V reference voltage. In order for no fault currents to be able to flow from the slave controller to the master controller in the event of a ground loss, due to short circuits, or due to reversed polarity, the transceiver unit of the slave controller is galvanically isolated from its device controller operating at the other reference voltage, for example, via optical couplers (not shown).

However, the use of galvanic isolation is expensive and requires extensive installation space.

SUMMARY

The object of the present disclosure is therefore to provide an arrangement for connecting a master controller using a first reference voltage to a slave controller of a motor vehicle using a second reference voltage, which requires no galvanic isolation and may therefore be manufactured in a more economical and compact manner.

The object is achieved via an arrangement made up of a master controller and a slave controller for a motor vehicle, wherein the master controller includes a first transceiver unit and the slave controller includes a second transceiver unit, and a communication line connecting the transceiver units, wherein the master controller operates at a first reference voltage and the slave controller operates at a second reference voltage, the voltages being different, and wherein a diode is provided in the communication line which prevents a current flow from the second transceiver unit in the direction of the first transceiver unit. In the event of a ground loss, in the event of a short circuit, or due to reversed polarity, a fault current flowing from the slave controller via the communication line into the master controller is therefore not able to flow.

It is preferred that the reference voltages are DC voltages.

Particularly preferably, the first reference voltage is lower than the second reference voltage, in order to ensure the current flow during the communication from the slave controller to the master controller. In this case, the first reference voltage and the second reference voltage each drop between a first reference potential and a second reference potential.

In addition, it is preferred that the first and second reference voltages are each connected to a central ground point, in particular of the motor vehicle. They thus have a shared second reference potential which is interconnected at the central ground point, i.e., ground. In this specific embodiment, the first reference potential of the first reference voltage is therefore lower than the first reference potential of the second reference voltage.

In a preferred specific embodiment which also achieves the object, the communication line is connectable to a first power supply line of the master controller via a pull-up resistor. It is preferred that the first reference potential of the first reference voltage is applied to the first power supply line. By connecting the communication line to the power supply line, approximately the first reference potential, reduced by the voltage drop at the pull-up resistor, is therefore applied to the communication line as the first voltage potential.

The arrangement of this specific embodiment is characterized by the pull-up resistor being situated in the master controller. As a result, the slave controller does not need the first reference voltage at all, and, in addition, no connection means are required for connecting a first power supply line and/or a first ground line for the first reference voltage at the slave controller. Since the first reference voltage is not provided at all at the slave controller, in addition, no galvanic isolation is required.

To connect the communication line to the first power supply line, it is preferred that the transceiver unit of the master controller includes a first electric switch. If the first electric switch is closed, it is preferred that the communication line is connected to the first power supply line. Preferably, a pulsing transmission signal may be generated on the communication line by alternately opening and closing the first electric switch. If the first electric switch is closed, the first voltage potential applied to the communication line is changed into a second voltage potential applied to the communication line. The second voltage potential is preferably approximately ground. By changing the time during which the first electric switch is closed or open, a pulse-width-modulated transmission signal may preferably be generated on the communication line. The master controller preferably includes a device controller with which the opening and closing of the first electric switch, in particular the period in which it is open or closed, is controllable. In this specific embodiment, a transmission from the master controller to the slave controller is therefore possible by opening and closing the first electric switch.

In addition, it is preferred that the transceiver unit of the slave controller includes a second electric switch. The second electric switch is provided for transmitting a communication signal from the slave controller to the master controller. Preferably, a pulsing transmission signal may also be generated on the communication line by alternately opening and closing the second electric switch. Also when transmitting from the slave controller to the master controller, it is preferred that the voltage applied to the communication line is provided via the power supply line of the master controller. For this purpose, it is preferred that the first electric switch of the first transceiver unit of the master controller is closed in a reception mode, in particular when transmitting the transmission signal from the slave controller to the master controller. When transmitting from the slave controller to the master controller, if the second switch is open, approximately the first reference potential of the first reference voltage, reduced by the voltage drop at the pull-up resistor, is then applied to the communication line. In this case as well, if the second electric switch is open, it is preferred that the first voltage potential applied to the communication line is changeable to a second voltage potential applied to the communication line, namely, also approximately to ground, by closing the second electric switch. Furthermore, it is preferred that a pulse-width-modulated transmission signal is able to be generated on the communication line via a change in the time in which the second electric switch is closed or open. Preferably, for this purpose, the slave controller also has a device controller via which the opening and closing of the second electric switch, in particular the period in which it is open or closed, is controllable. In this specific embodiment, a transmission from the slave controller to the master controller is therefore possible by opening and closing the second electric switch.

Since the first voltage potential required on the communication line both when transmitting from the slave controller to the master controller and when transmitting from the master controller to the slave controller is provided with the aid of the first reference potential, which is applied to the first power supply line, of the first reference voltage at which the master controller operates, only the power supply lines are provided at the slave controller which are required for the second reference voltage with which it operates. The master controller is therefore connected directly to the slave controller only via the communication line.

The first electric switch and/or the second electric switch are preferably formed as transistors, in particular as bipolar transistors. However, other electric switches, such as field-effect transistors, IGBTs (insulated-gate bipolar transistors), or relays are also usable as a first or second electric switch.

The diode is preferably situated in the transceiver unit of the slave controller. In principle, it may also be situated in the communication line or in the master controller. However, the placement in the slave controller has the advantage that the connection of multiple slave controllers to the communication line is possible via a simple parallel arrangement of the slave controllers. The cathode of the diode preferably points in the direction of the slave controller, so that a current flow is possible only from the master controller to the slave controller, or so that the current flow from the slave controller to the master controller is prevented.

The object is also achieved via a master controller for such an arrangement. It is preferred that the master controller includes the pull-up resistor. The first voltage potential on the communication line is therefore provided via the first reference voltage, which is applied to the first power supply line of the master controller. Therefore, the slave controller does not require the first reference voltage at all.

Therefore, in addition, no galvanic isolation is required.

It is preferred that the master controller includes a transceiver unit including a first electric switch which is provided for connecting the communication line to the first power supply line. In this case, the arrangement made up of the pull-up resistor connected to the first power supply line and the first electric switch acts like a current source which provides the signal provided on the power supply line. In principle, this arrangement is therefore replaceable by a current source.

The voltage potential available on the communication line is preferably determined via a voltage divider which includes the pull-up resistor and a second resistor.

Furthermore, the object is achieved via a slave controller for such an arrangement. It is preferred that the slave controller includes the diode in order to prevent the fault currents from the slave controller to the master controller.

The master controller and the slave controller are interconnected for transmission and reception in both directions only via a single communication line. In addition, no galvanic isolation is necessary between the device controller and the transceiver unit of the slave controller.

BRIEF DESCRIPTION OF THE DRAWINGS

The disclosure is described below based on figures. The figures are merely exemplary and do not limit the general idea of the present disclosure.

DETAILED DESCRIPTION

Figures 1A, 1B:
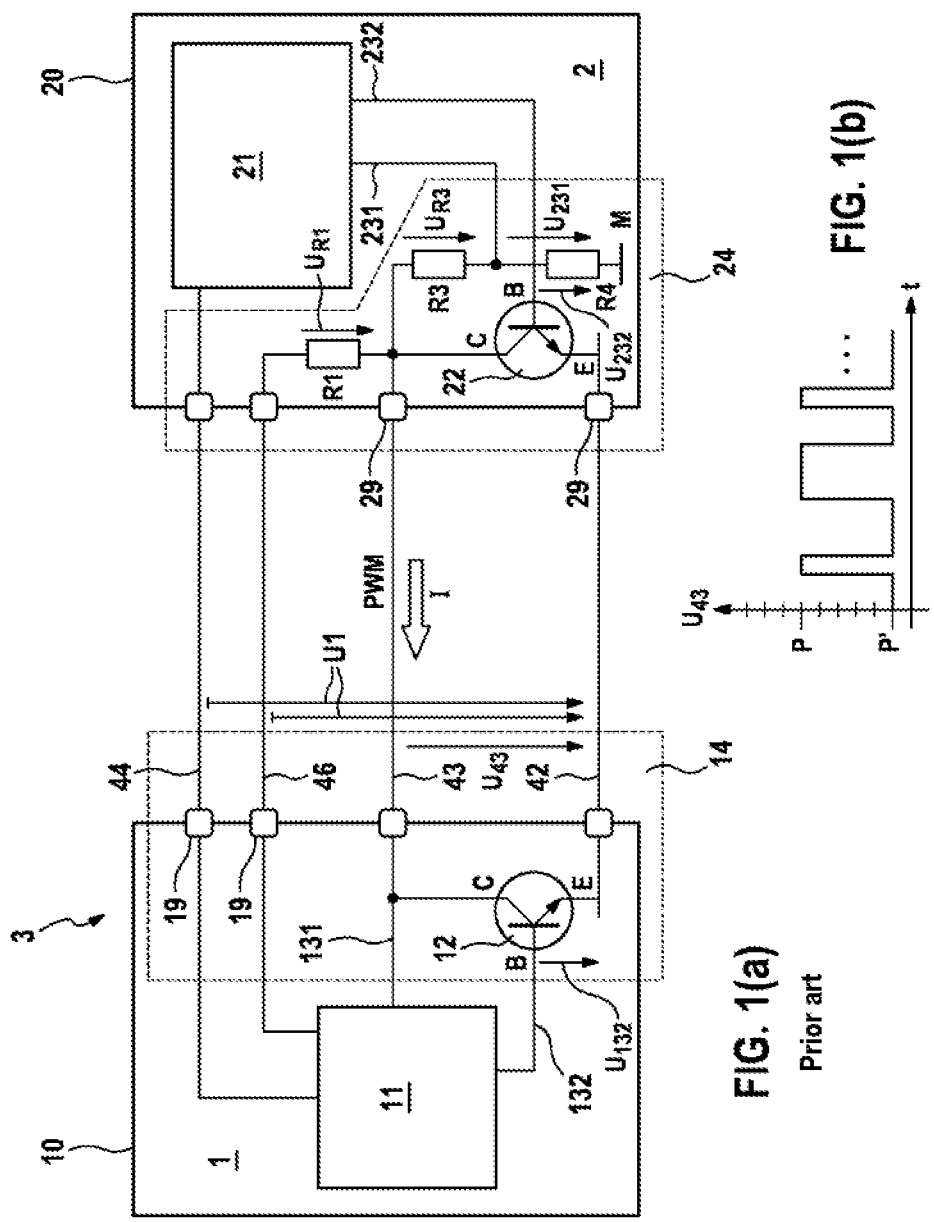
FIG. 1 shows, in (a), an arrangement for connecting a slave controller to a master controller according to the related art, wherein both the first slave controller and the master controller use the same reference voltage, and in (b), by way of example, a pulse-width-modulated transmission signal applied to a communication line.

FIG. 1 shows an arrangement 3 for the connection of a slave controller 2 to a master controller 1. Both the master controller 1 and the slave controller 2, which are also depicted below as components of the arrangement 3, use a 12V on-board electrical system voltage as a first reference voltage. Therefore, in this exemplary embodiment according to the related art, no galvanic isolation is required. Since the slave controller 2 operates at the same reference voltage as the master controller, a shared ground line 42 from the slave controller 2 to the master controller 1 is provided and is allowable.

The master controller 1 is situated in a controller housing 10. It includes a device controller 11 and a transceiver unit 14. The device controller includes a transmission line 132 for transmitting a transmission signal PWM from the master controller 1 to the slave controller 2, and a reception line 131 for receiving a transmission signal PWM from the slave controller 2 to the master controller 1.

The device controller 11 is connected via a first power supply line 44 and a ground line 42 to a direct-current source (not shown), which provides a first reference voltage U1. A first reference potential of the first reference voltage U1, here, a 12V on-board electrical system voltage of a motor vehicle, is applied to the first power supply line 44. A second reference potential of the first reference voltage U1, i.e., ground, is applied to the ground line 42.

In addition, the device controller 11 is connected to an ignition switch line 46 which is connected to an ignition key (not shown) of the motor vehicle, so that the master controller 1 is active only if the ignition is switched on. As a result, it is ensured that the master controller 1 and/or the slave controller 2 connected to the master controller 1 are not inadvertently active. The ignition switch line 46 is also at the first reference potential of the first reference voltage U1, i.e., at 12V.

For transmission, the transceiver unit 14 includes a first switch 12, which is designed here as a bipolar transistor. The bipolar transistor is situated in a common-emitter circuit. The terms first switch 12 and first transistor are used synonymously below. For this reason, the emitter E of the first transistor 12 is connected to the ground line 42, the base B of the first transistor 12 is connected to the transmission line 132 of the device controller 11, and the collector C is connected to a communication line 43 between the master controller 1 and the slave controller 2. The communication line 43 is also connected to the reception line 131 of the device controller 11 and is designed to have a high resistance.

The slave controller 2 is also situated in a slave controller housing 20. In order to be able to connect the slave controller 2 to the master controller 1, connecting plugs 19, 29 are provided in each of the housings 10, 20 of the components 1, 2, which are connected to each other in the interconnected state via connecting lines 42-44, 46.

The slave controller 2 also includes a device controller 21 which includes a transmission line 232 and a reception line 231. Here as well, a transceiver unit 24 including a second switch 22 is provided, which is designed as a bipolar transistor. This second transistor 22 is also connected in a common-emitter circuit. The terms second switch 22 and second transistor are used synonymously below.

The transmission line 232 of the slave controller 2 is connected to the base B of the second transistor 22. The emitter of the second transistor 22 is connected to the ground line 42. The collector C of the second transistor 22 is connected to the communication line 43. In addition, it is connected to a defined voltage via a pull-up resistor R1, namely, here, to the first reference voltage U1 via the ignition switch line 46. In principle, a connection of the pull-up resistor R1 to the first reference voltage U1 is also possible via the first power supply line 44. However, the connection via the ignition switch line 46 has the aforementioned advantage with respect to the connection via the first power supply line 44 that a communication is then possible only if the ignition is switched on.

The reception line 231 of the slave controller 2 is connected to a voltage divider R3R4 which includes a third resistor R3 and a fourth resistor R4. The third resistor R3 connects the communication line 43 to the reception line 231. The fourth resistor R4 connects the reception line 231 to ground M. As a result, when receiving the transmission signal PWM from the master controller 1 to the slave controller 2, a voltage potential $U_{231}$ which is applied to the reception line 231 and to the device controller 21 is adjusted in such a way that it is processable by the device controller 21 of the slave controller 2.

To transmit the transmission signal PWM from the master controller 1 to the slave controller 2, the first electric switch 12 is alternately opened and closed. For that purpose, for closing, a voltage (not shown) is provided by the device controller 11 of the master controller 1 at the base B of the first transistor 12, which makes a current flow I from the collector C to the emitter E possible. The first electric switch 12 is reopened in that this voltage is not provided, and therefore no current flow I is possible from the collector C to the emitter E. In this case, the second electric switch 22 of the transceiver unit 24 of the slave controller 2 is open.

If the first electric switch 12 is open, the first reference voltage U1 across the pull up-resistor R1 and the voltage divider R3R4 in the slave controller 2 drops to ground. The communication line 43 is then at a first voltage potential P which corresponds to the first reference potential 12V of the first reference voltage U1, reduced by the voltage drop $U_{R1}$ at the pull up resistor R1.

If the first electric switch 12 is closed, the communication line 43 is connected to ground M via the first electric switch 12. A second voltage potential P' is then applied to the communication line 43, i.e., approximately ground M or a second voltage potential P' which is slightly higher than ground M. The voltage $U_{43}$ applied to the reception line 43 therefore pulses between the first voltage potential P and the second voltage potential P'.

The voltage $U_{132}$ applied to the base B of the first transistor 12, in particular the time t in which this voltage $U_{132}$ is high enough for the first transistor 12 to be enabled or for the first switch 12 to be closed, is controllable via the device controller 11 of the master controller 1. This control therefore produces a pulse-width-modulated transmission signal PWM, $U_{43}$ on the communication line 43. FIG. 1(b) shows such a signal PWM, $U_{43}$.

The transmission signal PWM is also applied to the reception line 231 of the slave controller 2, wherein the first and second voltage potentials P, P' are reduced by the voltage $U_{R3}$ dropping across the third resistor R3 of the voltage divider R3R4. As a result, the device controller 21 of the slave controller 2 sees the transmission signal PWM transmitted by the master controller 1 and is able to process it.

To transmit the transmission signal PWM from the slave controller 2 to the master controller 1, the second electric switch 22 situated in the slave controller 2 is alternately opened and closed. For this purpose, a sufficiently high voltage $U_{232}$ is provided at the base B of the second electric switch 21 via the transmission line 232 of the device controller 21 of the slave controller 2, so that the second transistor 22 is enabled and a current is able to flow from the collector C to the emitter E. In this case, the first electric switch 12 in the master controller 1 is open.

If the second switch 22 is open, the first reference voltage U1 drops across the pull-up resistor R1 and the voltage divider R3R4 in the slave controller 2. The communication line 43 is then at the first voltage potential P, which corresponds to the first reference potential 12V of the first reference voltage U1, reduced by the voltage drop $U_{R1}$ at the pull-up resistor R1.

If the second electric switch 22 is closed, the communication line 43 is connected to ground M via the second electric switch 22. The communication line 43 is then at the second voltage potential P', i.e., also approximately at ground M. The voltage $U_{43}$ applied to the reception line 43 during the transmission from the slave controller 2 to the master controller 1 therefore pulses between the first voltage potential P and the second voltage potential P', in a manner similar to the transmission from the master controller 1 to the slave controller 2.

Since the communication line 43 is connected to the reception line 131 device controller 11 of the master controller 1, the device controller 11 of the master controller 1 sees the transmission signal PWM from the slave controller 2 and is able to process it.

In this arrangement 3 according to the related art, both controllers 1, 2 operate at the same reference voltage U1. The interconnection of the power supply lines 42, 44, 46 of the controllers 1, 2 is therefore non-critical.

Figure 2:
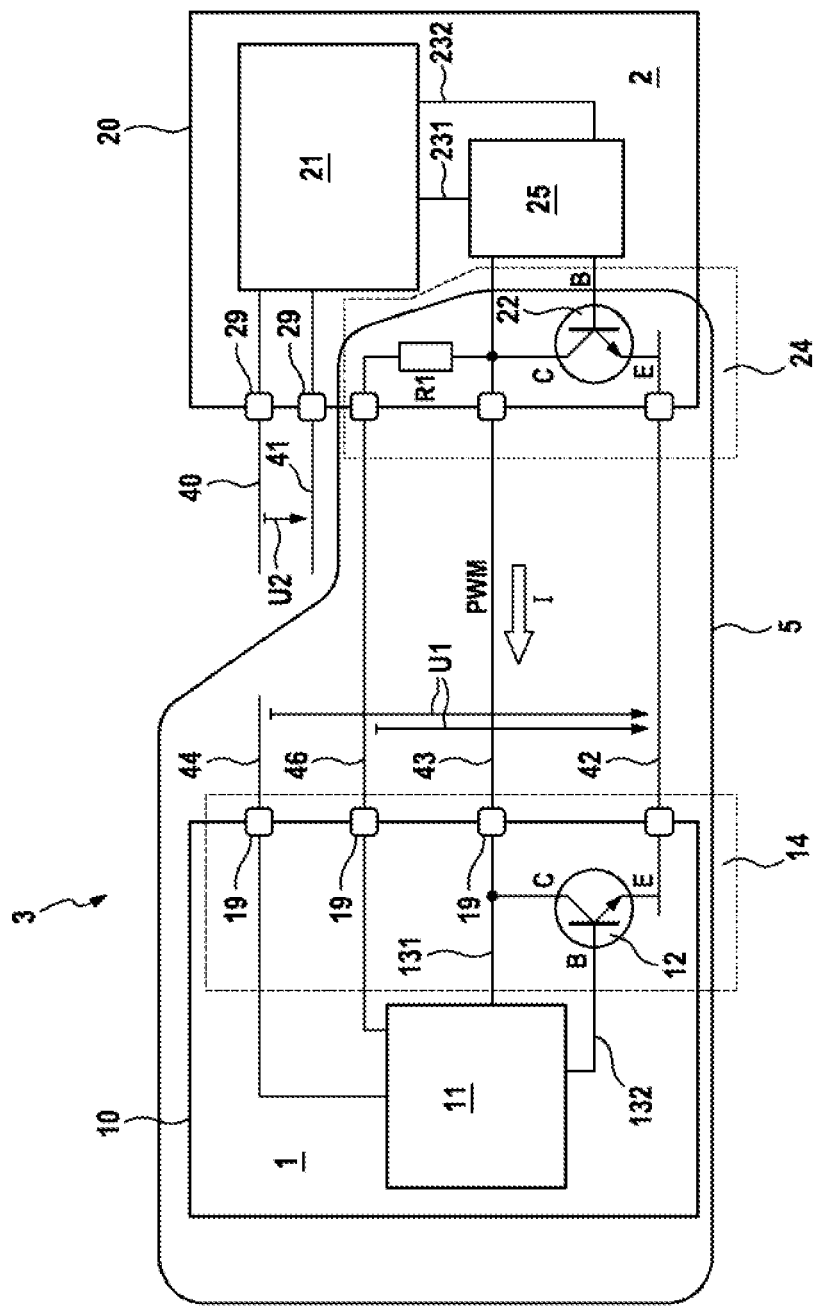
FIG. 2 shows an additional arrangement for connecting a slave controller to the master controller of FIG. 1 according to the related art, wherein the slave controller uses a reference voltage which is different from that of the master controller.

In order to prevent fault currents which could damage the master controller 1, the connection of slave controllers 2 which use a reference voltage U2 which is different from that of the master controller 1 has previously been allowed only via a galvanic isolation 25, for example, via optical couplers (not shown). FIG. 2 shows such an arrangement 3 according to the related art.

In this arrangement 3, the device controller 21 of the slave controller 2 operates at a second reference voltage U2 which is different from the first reference voltage U1, i.e., for example, at 24V or at 48V. The slave controller 2 is therefore connected via a second power supply line 40 and a second ground line 41 to a second DC voltage source (not shown) which provides the second reference voltage U2.

The slave controller 2 is also different from the slave controller 2 of FIG. 1 in that a galvanic isolation 25 is provided between the transceiver unit 24 of the slave controller 2 of FIG. 2 and its device controller 21. As a result, the reception line 231, which is directly connected to the communication line 43 in the arrangement 3 of FIG. 1, is galvanically isolated from it here. In addition, as a result, the transmission line 232, which is directly connected to the base B of the second transistor 22 in the arrangement 3 of FIG. 1, is also galvanically isolated from it here. As a result, all electrical connections 231, 232 between the device controller 21 operating at the second reference voltage U2 and the transceiver unit 24 operating at the first reference voltage U1 are galvanically isolated from each other here.

Fault currents due to a short circuit, loss of ground, or reversed polarity on the side of the device controller 21 of the slave controller 2 are therefore not able to flow at all via the transceiver unit 24 of the slave controller 2 to the master controller 1.

Moreover, the design of the transceiver unit 24 of the slave controller 2 of this specific embodiment is identical to that of the slave controller 2 of FIG. 1. This is schematically depicted by a line 5. In addition, in this arrangement 3, the same master controller 1 is used as in FIG. 1. The transmission from the master controller 1 to the slave controller 2 and from the slave controller 2 to the master controller 1 is therefore carried out in a manner similar to that already described in FIG. 1.

Figure 3:
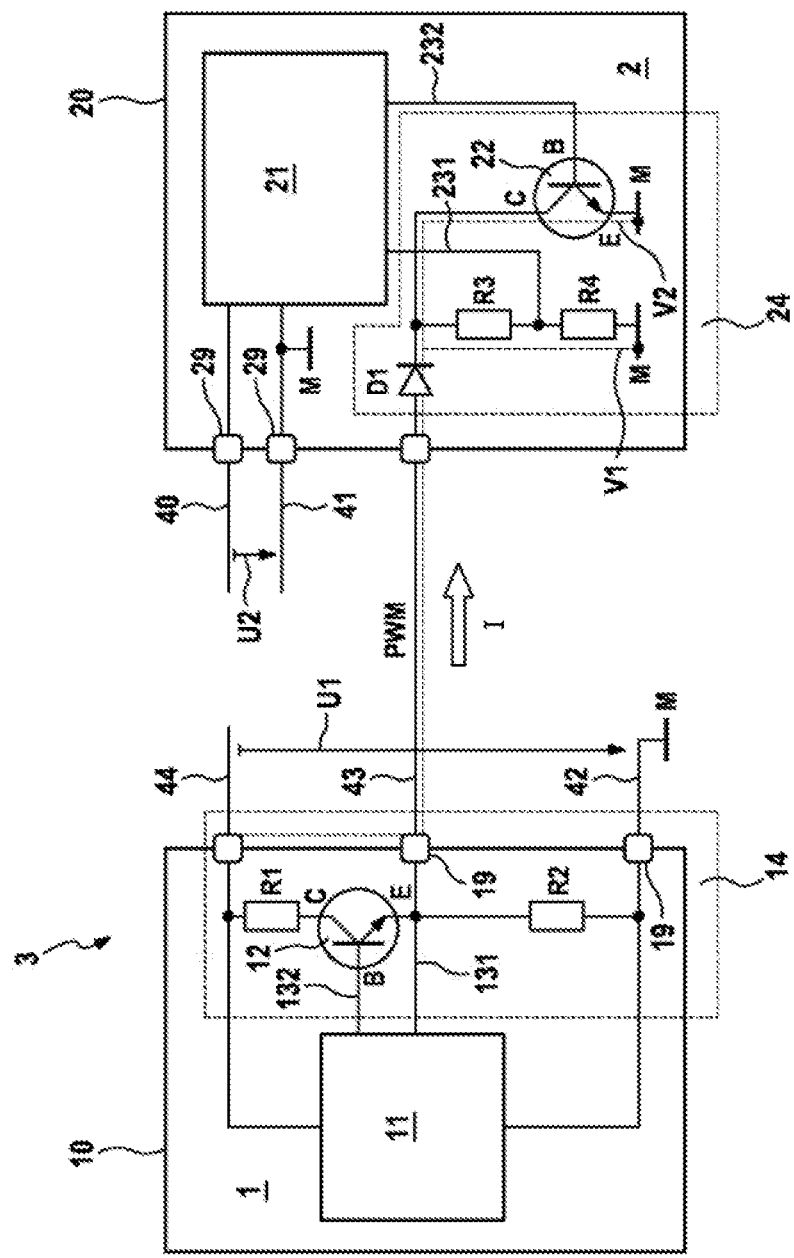
FIG. 3 shows an arrangement according to the present disclosure for connecting a slave controller to a master controller, wherein the slave controller uses a reference voltage which is different from that of the master controller.

FIG. 3 shows an arrangement 3 of a master controller 1 and a slave controller 2, in which a galvanic isolation 25 (see FIG. 2) of the connecting lines 231, 232 from the device controller 21 to the transceiver unit 24 of the slave controller 2 may be omitted.

In this specific embodiment, on the one hand, a fault current from the slave controller 2 via the communication line 43 to the master controller 1 is prevented with the aid of a diode D1 which is situated in the communication line 43. Here, the diode D1 is situated in the slave controller 2, but in principle may also be situated anywhere else in the communication line 43, also in the master controller 1.

In addition, when transmitting over the communication line 43, the first voltage potential P applied to it is also provided via the first power supply line 44 or the ignition switch line 46. However, here, the pull-up resistor R1 is not situated in the slave controller 2, but rather in the master controller 1. As a result, the first reference voltage U1 is not required at all in the slave controller 2, so that the master controller 1 and the slave controller 2 are interconnected only via the communication line 43.

In this arrangement as well, the master controller 1 is situated in a controller housing 10. It also includes a device controller 11 and a transceiver unit 14. The device controller includes a transmission line 132 for transmitting a transmission signal PWM from the master controller 1 to the slave controller 2 and a reception line 131 for receiving a transmission signal PWM from the slave controller 2 to the master controller 1.

The device controller 11 is connected via a first power supply line 44 and a ground line 42 to the DC voltage source (not shown), which provides the first reference voltage U1. The first reference potential of the first reference voltage U1, i.e., the 12V on-board electrical system voltage, is applied to the first power supply line 44. The second reference potential of the first reference voltage U1, i.e., ground, is applied to the ground line 42.

The ignition switch line 46 is not shown here.

For transmission, the transceiver unit 14 includes the first switch 12, which is also designed here as a bipolar transistor. It is also situated in a common-emitter circuit. For this purpose, the emitter E of the first transistor 12 is connected to the communication line 43, the base B of the first transistor 12 is connected to the transmission line 132 of the device controller 11, and the collector C of the first transistor 12 is connected via the pull-up resistor R1 to the first power supply line 44. In addition, the communication line 43 is connected to the ground line 42 via a second resistor R2. In addition, it is connected to the reception line 131 of the device controller 11, which is also designed here to have a high resistance.

The slave controller 2 is also situated in a slave controller housing 20. The slave controller 2 also includes the device controller 21, which includes the transmission line 232 and the reception line 231. Here as well, the transceiver unit 24 is provided including a second switch 22 which is designed as a bipolar transistor. This second transistor 22 is also connected in a common-emitter circuit.

The transmission line 232 of the slave controller 2 is connected to the base B of the second transistor 22. The emitter of the second transistor 22 is connected to ground M. The collector C of the second transistor 22 is connected to the communication line 43.

Here as well, the reception line 231 of the slave controller 2 is connected to a voltage divider R3R4 which includes a third resistor R3 and a fourth resistor R4. The third resistor R3 connects the communication line 43 to the reception line 231; the fourth resistor R4 connects the reception line 231 to ground M. As a result, when receiving the transmission signal PWM from the master controller 1 to the slave controller 2, a voltage potential $U_{231}$ applied to the reception line 231 or to the device controller 21 is also adjusted here in such a way that it is processable by the device controller 21 of the slave controller 2.

The device controller 21 of the slave controller 2 operates at the second reference voltage U2, and is therefore connected here via the second power supply line 40 and the second ground line 41 to the second DC voltage source, which provides this voltage.

To transmit the transmission signal PWM from the master controller 1 to the slave controller 2, the first electric switch 12 is alternately opened and closed. For this purpose, for closing, the voltage (not shown) is also provided here by the device controller 11 of the master controller 1 at the base B of the first transistor 12, which makes the current flow I from the collector C to the emitter E possible, and for opening, it is correspondingly reduced. In this case, the second electric switch 22 of the transceiver unit 24 of the slave controller 2 is open.

If the first electric switch 12 is closed, the first reference voltage U1 across the pull-up resistor R1 and the voltage divider R3R4 in the slave controller 2 drops to ground. This first electrical connection V1 is schematically depicted by dashed lines in FIG. 3. The communication line 43 is then at the first voltage potential P, which corresponds to the first reference potential 12V of the first reference voltage U1, reduced by the voltage drop $U_{R1}$ at the pull-up resistor R1. In order to provide a defined voltage potential P on the communication line 43 in the case of a closed first electric switch 12, a second resistor R2 is provided, which, along with the pull-up resistor R1, forms a voltage divider R1R2.

If the first electric switch 12 is open, the first connection V1 is interrupted and the communication line 43 is connected to ground M via the voltage divider R3R4. A second voltage potential P' is then applied to the communication line 43, i.e., approximately ground M or a second voltage potential P' which is slightly higher than ground M. The voltage $U_{43}$ applied to the reception line 43 therefore pulses between the first voltage potential P and the second voltage potential P' in a manner similar to the transmission signal PWM shown in FIG. 1(b).

Here as well, the voltage $U_{132}$ applied to the base B of the first transistor 12, in particular the time t in which this voltage $U_{132}$ is high enough for the first transistor 12 to be enabled or for the first switch 12 to be closed, is controllable via the device controller 11 of the master controller 1. This control therefore also produces a pulse-width-modulated transmission signal PWM, $U_{43}$ on the communication line 43.

The transmission signal PWM is also applied to the reception line 231 of the slave controller 2, wherein the first and second voltage potentials P, P' are reduced by the voltage $U_{R3}$ dropping across the third resistor R3 of the voltage divider R3R4. As a result, the device controller 21 of the slave controller 2 sees the transmission signal PWM transmitted by the master controller 1 and is able to process it.

To transmit the transmission signal PWM from the slave controller 2 to the master controller 1, the second electric switch 22 situated in the slave controller 2 is alternately opened and closed. For this purpose, a sufficiently high voltage $U_{232}$ is provided at the base B of the second electric switch 21 via the transmission line 232 of the device controller 21 of the slave controller 2, so that the second transistor 22 is enabled and a current is able to flow from the collector C to the emitter E. In this case, the first electric switch 12 in the master controller 1 is closed.

If the second electric switch 22 is open, the first reference voltage U1 across the pull-up resistor R1 and the voltage divider R3R4 in the slave controller 2 drops to ground. This second electrical connection in the case of closed first and second switches 12, 22 is schematically depicted in FIG. 3 by a dashed line V2. The communication line 43 is then at the first voltage potential P, which corresponds to the first reference potential 12V of the first reference voltage U1, reduced by the voltage drop $U_{R1}$ at the pull-up resistor R1.

If the second electric switch 22 is closed, the communication line 43 is connected to ground M via the second electric switch 22. The communication line 43 is then at the second voltage potential P', i.e., also approximately ground M. The voltage $U_{43}$ applied to the reception line 43 during the transmission from the slave controller 2 to the master controller 1 therefore pulses between the first voltage potential P and the second voltage potential P', in a manner similar to the transmission from the master controller 1 to the slave controller 2.

Since the communication line 43 is connected to the reception line 131 of the device controller 11 of the master controller 1, the device controller 11 of the master controller 1 sees the transmission signal PWM from the slave controller 2 and is able to process it.

In all aforementioned specific embodiments, the ground potential or the ground of the DC voltage sources is provided via a central ground point M in the motor vehicle. The central ground point M and the ground or the ground potential are therefore depicted here having the same reference numeral M. However, in order to prevent a current flow via the ground lines 41, 42 which are provided at the controllers 1, 2, they are not interconnected.

The arrangement of FIG. 3 requires only a single connection between the two controllers 1, 2, i.e., the communication line 43. In addition, it requires no galvanic isolation 25. As a result, it may be manufactured more economically and is easier to install.

Figure 4:
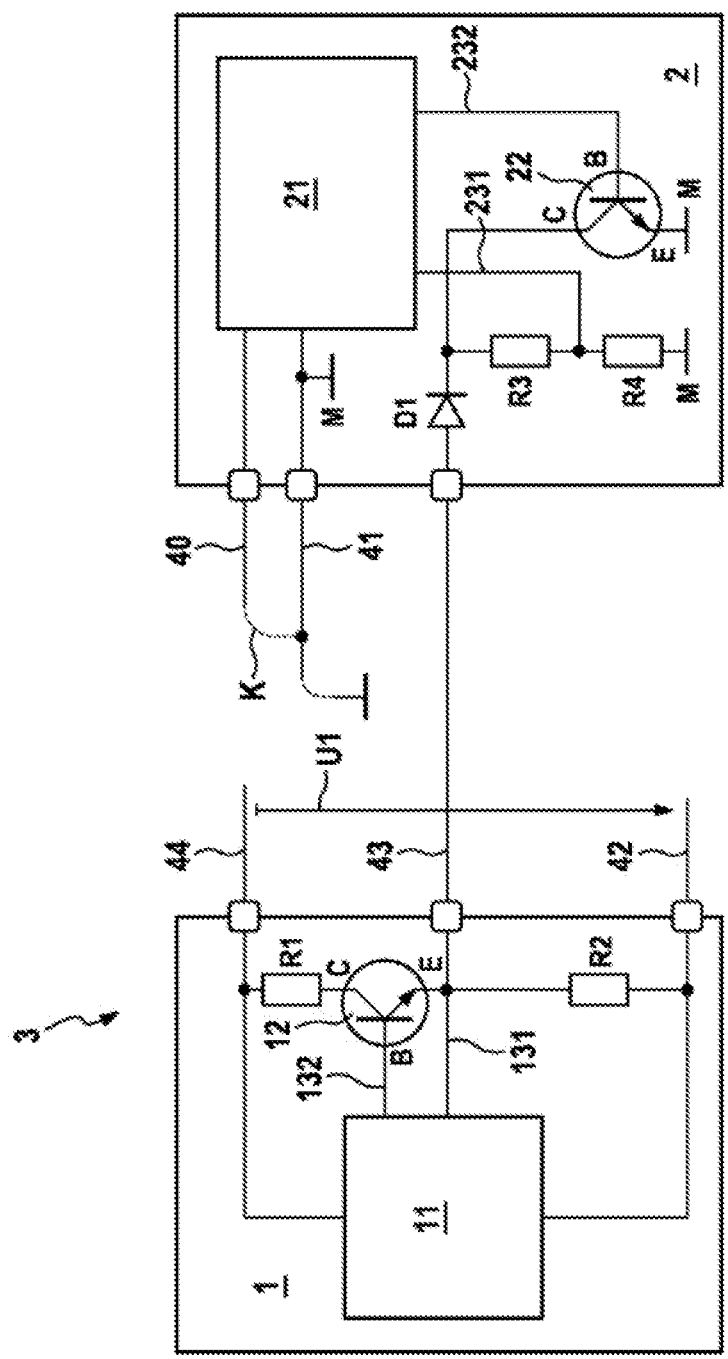
FIG. 4 schematically depicts, in (a), a loss of ground on the side of the slave controller, and in (b), a reversed polarity of a second reference voltage of the slave controller.
Figure 4:
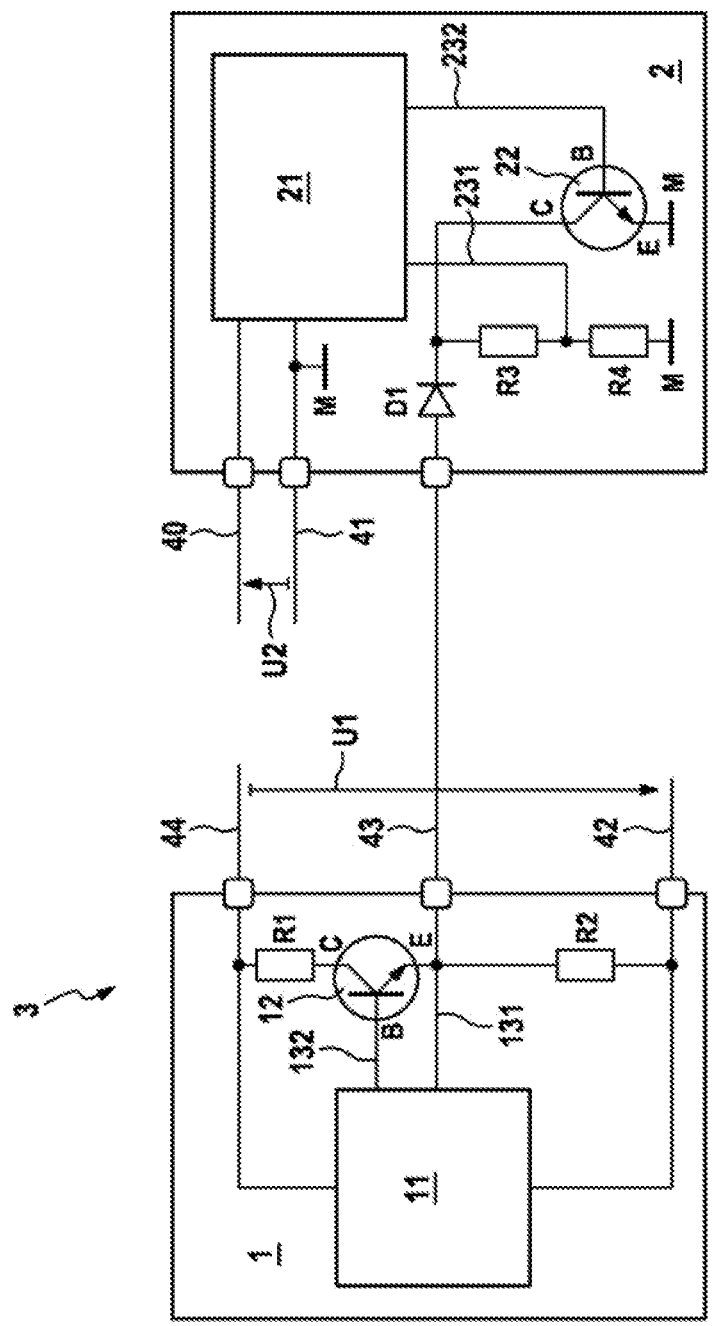

FIGS. 4 (a) and 4 (b) schematically depict fault cases. FIG. 4 (a) shows a loss of ground or a short circuit between the second power supply line 40 and the second ground line 41 of the slave controller 2. As a result, the first reference potential of the second reference voltage, i.e., for example, 24V or 48V, is at ground. However, a fault current via the communication line 43 to the master controller 1 is prevented by the diode D1.

FIG. 4 (b) schematically depicts a reversed polarity of the second power supply line 40 and the second ground line 41. As a result, the first reference potential of the second reference voltage, i.e., for example, 24V or 48V, is also at ground. However, in this case, a fault current via the communication line 43 to the master controller 1 is also prevented by the diode D1.

The invention claimed is:

1. An arrangement for a motor vehicle, comprising:
a master controller including a first transceiver unit, the master controller being configured to operate with a first reference voltage;
a slave controller including a second transceiver unit, the slave controller being configured to operate with a second reference voltage;
a communication line connecting the first and the second transceiver units; and
a diode arranged in the communication line and configured to prevent a current flow from the second transceiver unit in a direction of the first transceiver unit,
wherein the first reference voltage has a first reference potential which is lower than a first reference potential of the second reference voltage, and
wherein the first and second reference voltages have a shared second reference potential which is interconnected at a central ground point of the motor vehicle.

2. The arrangement as claimed in claim 1, wherein:
the communication line is configured to connect to a first power supply line via a pull-up resistor, and
the pull-up resistor is included in the master controller.

3. The arrangement as claimed in claim 1, wherein the first transceiver unit of the master controller includes a first electric switch, and the second transceiver unit of the slave controller includes a second electric switch.

4. The arrangement as claimed in claim 3, wherein a pulsing transmission signal is generated on the communication line by alternately opening and closing the first or the second electric switch.

5. The arrangement as claimed in claim 3, wherein a transmission signal from the master controller to the slave controller is generated by alternately opening and closing the first switch.

6. The arrangement as claimed in claim 3, wherein a transmission signal from the slave controller to the master controller is generated by alternately opening and closing the second switch.

7. The arrangement as claimed in claim 3, wherein the first electric switch of the first transceiver unit of the master controller is closed in a reception mode.

8. The arrangement as claimed in claim 3, wherein the first electric switch and/or the second electric switch are configured as transistors.

9. The arrangement as claimed in claim 1, wherein the diode is included in the second transceiver unit of the slave controller.

10. A master controller for an arrangement for a motor vehicle comprising:
a first transceiver unit; and
a pull-up resistor,
wherein the arrangement includes a slave controller including a second transceiver unit, and a communication line connecting the first transceiver unit and the second transceiver unit,
wherein the master controller is configured to operate at a first reference voltage and the slave controller is configured to operate at a second reference voltage,
wherein the first reference voltage has a first reference potential which is lower than a first reference potential of the second reference voltage,
wherein the first and second reference voltages have a shared second reference potential which is interconnected at a central ground point of the motor vehicle,
wherein a diode is included in the communication line that is configured to prevent a current flow from the second transceiver unit in a direction of the first transceiver unit, and
wherein the communication line is configured to connect to a first power supply line via the pull-up resistor.

11. A slave controller for an arrangement for a motor vehicle, comprising:
a transceiver unit; and
a diode,
wherein the arrangement includes a master controller including another transceiver unit, and a communication line connecting the transceiver unit and the other transceiver unit,
wherein the master controller is configured to operate at a first reference voltage and the slave controller is configured to operate at a second reference voltage,
wherein the first reference voltage has a first reference potential which is lower than a first reference potential of the second reference voltage,
wherein the first and second reference voltages have a shared second reference potential which is interconnected at a central ground point of the motor vehicle, and
wherein the diode is included in the communication line and is configured to prevent a current flow from the transceiver unit in a direction of the other transceiver unit.

12. An arrangement for a motor vehicle, comprising:
a master controller including a first transceiver unit, the master controller being configured to operate with a first reference voltage;
a slave controller including a second transceiver unit, the slave controller being configured to operate with a second reference voltage;
a communication line connecting the first and the second transceiver units; and
a diode arranged in the communication line and configured to prevent a current flow from the second transceiver unit in a direction of the first transceiver unit,
wherein the first reference voltage is different from the second reference voltage, and
wherein the diode is included in the second transceiver unit of the slave controller.

\* \* \* \* \*